United States Patent
Fukushima (10) Patent No.: US 10,489,098 B2
(45) Date of Patent: Nov. 26, 2019

(54) IMAGE FORMING APPARATUS, IMAGE FORMING SYSTEM, AND IMAGE FORMING METHOD THAT ENABLES DIRECT CONNECTION EASILY

(71) Applicant: KYOCERA Document Solutions Inc., Osaka (JP)

(72) Inventor: Keisuke Fukushima, Concord, CA (US)

(73) Assignee: KYOCERA Document Solutions Inc., Osaka (JP)

(*) Notice: Subject to any disclaimer, the term of this patent is extended or adjusted under 35 U.S.C. 154(b) by 0 days.

(21) Appl. No.: 15/849,054

(22) Filed: Dec. 20, 2017

(65) Prior Publication Data
US 2019/0187946 A1    Jun. 20, 2019

(51) Int. Cl.
*G06F 3/12* (2006.01)
*H04W 4/80* (2018.01)
*G06F 21/32* (2013.01)

(52) U.S. Cl.
CPC .......... *G06F 3/1292* (2013.01); *G06F 3/1236* (2013.01); *G06F 3/1238* (2013.01); *G06F 21/32* (2013.01); *H04W 4/80* (2018.02)

(58) Field of Classification Search
CPC .... G06F 3/1292; G06F 3/1236; G06F 3/1238; G06F 21/32; H04W 4/80
See application file for complete search history.

(56) References Cited

U.S. PATENT DOCUMENTS

| | | | | |
|---|---|---|---|---|
| 2014/0320908 A1* | 10/2014 | Iwauchi | ............... | H04L 45/24 358/1.15 |
| 2015/0248265 A1* | 9/2015 | Kang | ............... | G06F 3/1292 358/1.15 |
| 2017/0251366 A1* | 8/2017 | Perna | ............... | A61B 3/1216 |
| 2018/0077124 A1* | 3/2018 | Ramoutar | ............... | H04L 63/067 |
| 2018/0260186 A1* | 9/2018 | Zhu | ............... | G06F 3/041 |

* cited by examiner

*Primary Examiner* — Iriana Cruz
(74) *Attorney, Agent, or Firm* — Hawaii Patent Services; Nathaniel K. Fedde; Kenton N. Fedde (57) ABSTRACT

Provided is an image forming apparatus that can establish secure wireless direct connection with a terminal. A connection information transmitting part transmits connection information of wireless direct connection to a terminal by short-range wireless connection. A connection changing information generating part generates different connection changing information from connection information and transmits to the terminal in which the wireless direct connection has been established by the connection information transmitted by the connection information transmitting part. A connection changing part changes into the connection changing information transmitted by the connection changing information generating part and performs wireless direct connection with the terminal. In the result, secure wireless direct connection is enabled.

14 Claims, 9 Drawing Sheets

IMAGE FORMING APPARATUS, IMAGE FORMING SYSTEM, AND IMAGE FORMING METHOD THAT ENABLES DIRECT CONNECTION EASILY

BACKGROUND

The present disclosure relates to an image forming apparatus, an image forming system, and an image forming method, and is particularly-related to the image forming apparatus, the image forming system, and the image forming method, which direct connection is possible, easily.

An image forming apparatus, such as an MFP (Multifunctional Peripheral) or a printer that can print a document and an image, are present.

In a typical technology, an image forming apparatus connectable with a portable terminal are disclosed. For example, a registry request for an event that should be notified to the portable terminal when it occurs in an image forming apparatus is received from the portable terminal. Whereupon, registration about the event is performed according to the received registry request. Then, the WiFi-Direct connection (wireless direct connection) with the specific portable terminal is disconnected. In this case, an image forming apparatus specifies the event where the respective specific portable terminal is registered as a communication destination in the registered events. Then, an image forming apparatus cancels the registration about the specified event. As configured in this way, the registration about the event notification to the communication device is prevented from continuously-remaining in an image forming apparatus.

SUMMARY

An image forming apparatus of the present disclosure is provided with a connection information transmitting part, a connection changing information generating part, and a connection changing part. The connection information transmitting part transmits connection information of wireless direct connection to a terminal by short-range wireless connection. The connection changing information generating part generates connection changing information being different from the connection information and transmits the connection changing information to the terminal. In this case, with the terminal, the wireless direct connection is established by the connection information transmitted by the connection information transmitting part. The connection changing part changes into the connection changing information transmitted by the connection changing information generating part and performs the wireless direct connection with the terminal.

An image forming system of the present disclosure includes a terminal and an image forming apparatus that can be printed from the terminal. The terminal is provided with a connection information acquiring part, a direct connection part, and a changed wireless direct connection part. The connection information acquiring part is connected by short-range wireless connection between a self-apparatus and the image forming apparatuses and receives connection information of wireless direct connection. The direct connection part performs the wireless direct connection between the self-apparatus and the image forming apparatus by the connection information acquired by the connection information acquiring part. The changed wireless direct connection part receives connection changing information being different from the connection information when the wireless direct connection has been established by the direct connection part and performs the wireless direct connection by the connection changing information. The image forming apparatus is provided with a connection information transmitting part, a connection changing information generating part, and a connection changing part. The connection information transmitting part transmits the connection information to a terminal with the short-range wireless connection. The connection changing information generating part generates the connection changing information and transmits it to the terminal. In this case, with terminal, the wireless direct connection has been established by the connection information transmitted by the connection information transmitting part. The connection changing part changes into the connection changing information transmitted by the connection changing information generating part and performs the wireless direct connection with the terminal.

An image forming method of the present disclosure is an image forming method executed by an image forming apparatus. The image forming apparatus transmits the connection information of wireless direct connection to a terminal by short-range wireless connection. The image forming apparatus generates connection changing information different from the connection information and transmits it to the terminal. In this case, with the terminal, the wireless direct connection is established by the transmitted connection information. The image forming apparatus changes into the transmitted connection changing information and performs the wireless direct connection with the terminal.

DETAILED DESCRIPTION

First Embodiment

[System Configuration of Image Forming System X]

Figure 1:
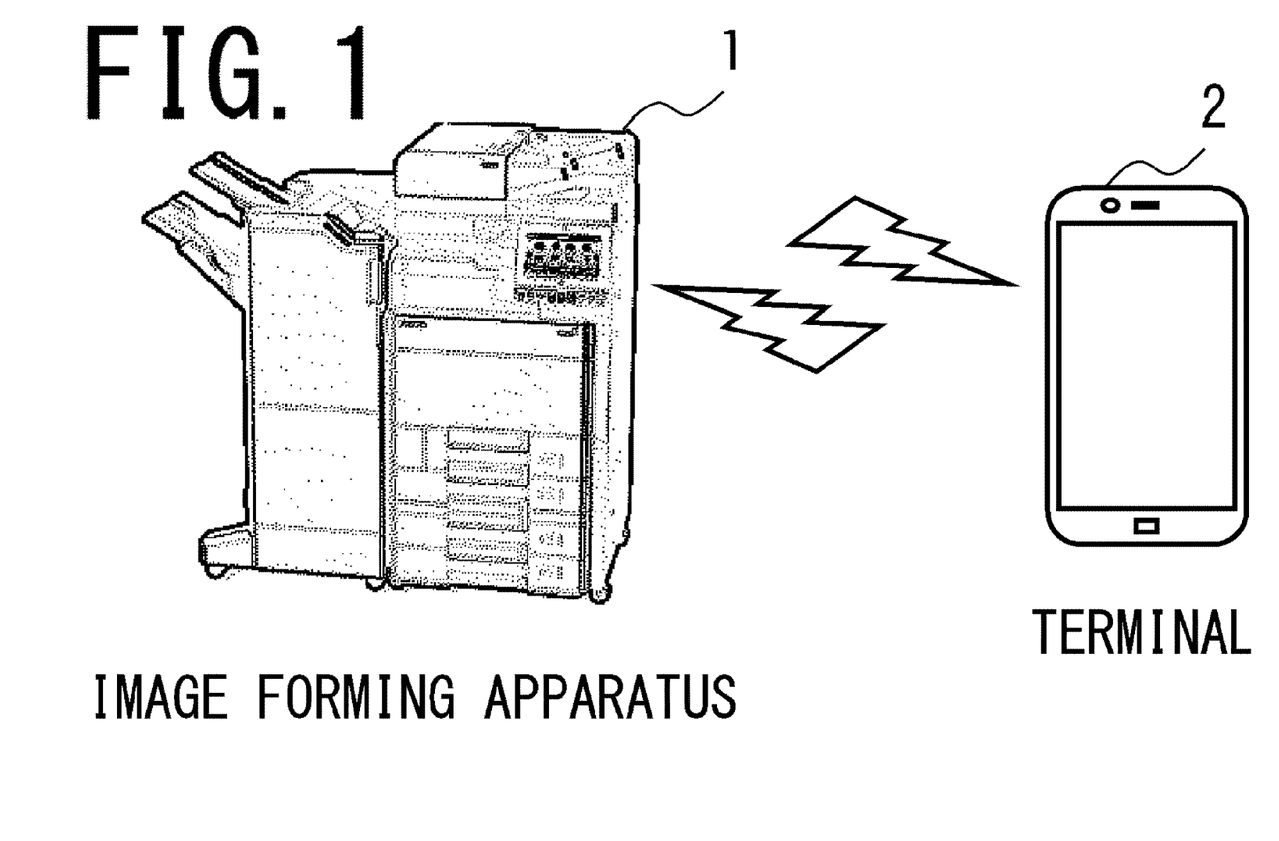
FIG. 1 is a system configuration figure of the image forming system according to a first embodiment in the present disclosure.

First, as refer to FIG. 1, an overall system configuration of the image forming system X according to a first embodiment of the present disclosure is described. Image forming system X includes image forming apparatus 1 and terminal 2. Image forming apparatus 1 is connected with terminal 2 for a user and performs printing, or the like.

Image forming apparatus 1 is an MFP, a printer having a simple printing function, or the like, and is provided with the wireless connection function. Image forming apparatus 1 may be installed in a university, a co-op, a convenience store, or the like. Also, image forming apparatus 1 is performed wireless connection and is printed by a user, such as a common visitor to a store, or the like. In this case, network printing by using a server, or the like, on a so-called "cloud" may be performed. Also, it is also possible to print a file of the electronic filing document or photograph that are stored in image forming apparatus 1 or to scan with converting a manuscript of paper(s) into an electronic document. Also, image forming apparatus 1 may be possibly installing such purpose-oriented application software for exclusive use (hereinafter, it is just called as an "application."). Also, in the following, the application for image forming apparatus 1 is called to an "apparatus application."

Terminal 2 is mobile terminal for a user provided with a wireless connection function. Terminal 2 may also be connected with image forming apparatus 1, and the application for exclusive use for performing printing, or the like, may be installed. Also, in the following, an application for terminal 2 is called "terminal application."

In the present embodiment, image forming apparatus 1 and terminal 2 are connected with a wireless connection. Also, in the present embodiment, the apparatus application and the terminal application cooperate to establish a wireless connection, and a secure wireless connection can be generated.

Figure 2:
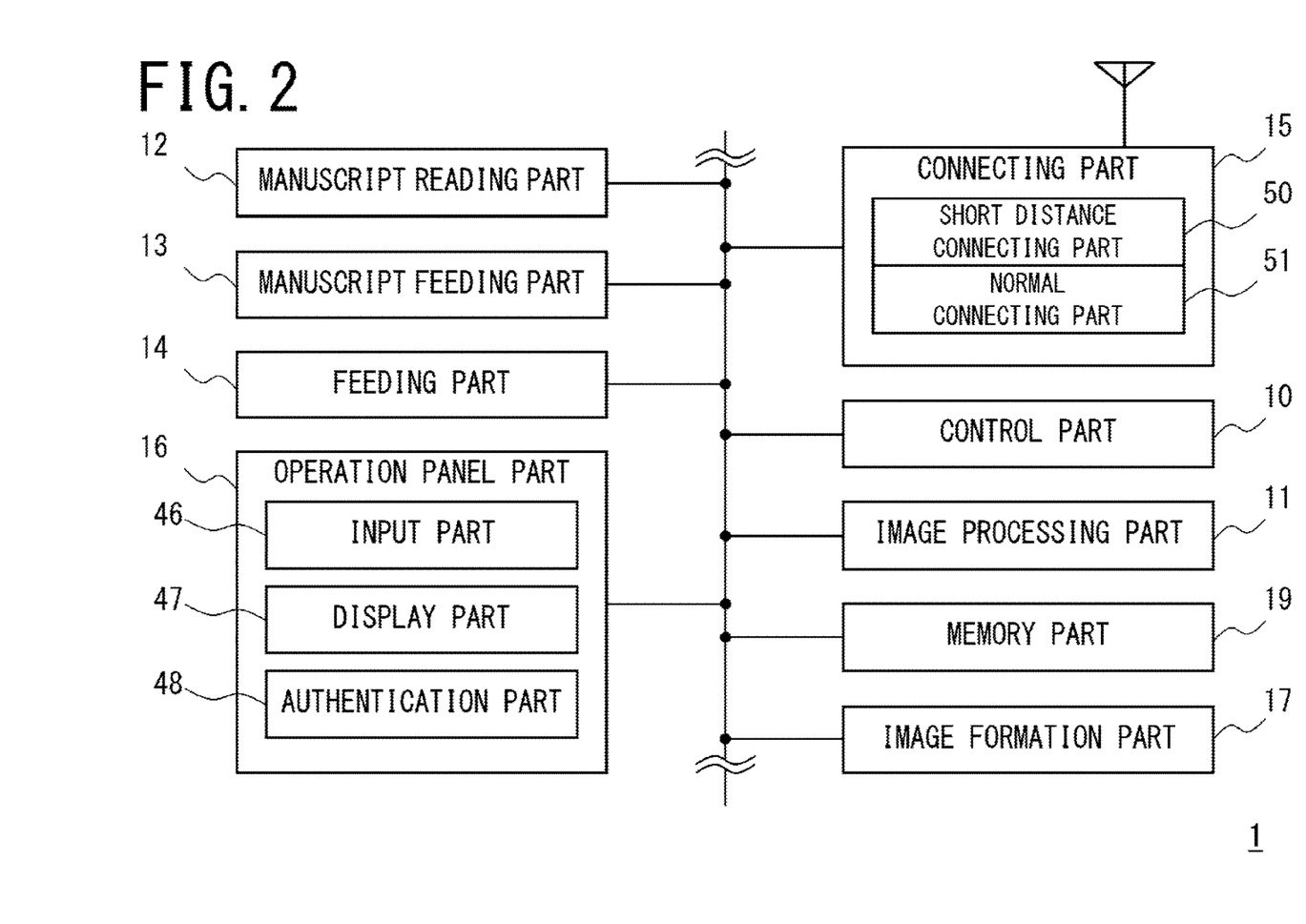
FIG. 2 is a block diagram showing the control configuration of the image forming apparatus as shown in FIG. 1.

Then, as refer to FIG. 2, a control configuration of image forming apparatus 1 is described. Image forming apparatus 1 includes image processing part 11, manuscript reading part 12, manuscript feeding part 13, feeding part 14, connecting part 15, operation panel part 16, image formation part 17, and memory part 19, or the like. Each part is connected to control part 10 and its operation is controlled by control part 10.

Control part 10 is an information processing part, such as CPU (Central Processing Unit). Control part 10 reads the control program stored in memory part 19 and executes the control program to be operated as each part of the functional block as described later. Also, control part 10 controls a whole device corresponding to the specified instructions information inputted from terminal 2 or operation panel part 16.

Image processing part 11 is an information processing part specified for image processing. Image processing part 11 performs the specified image processing for image data. For example, image processing part 11 performs various image processing, such as scaling, density control, gradation adjustment, image improvement, or the like. Image processing part 11 stores the image read by manuscript reading part 12 as print data to memory part 19.

Manuscript reading part 12 reads a set manuscript. Also, manuscript reading part 12 is arranged on an upper part of the body part of image forming apparatus 1. Manuscript reading part 12 is provided with a scanner, platen glass, and a manuscript reading slit. Manuscript reading part 12 moves the scanner to the position that faces the platen glass when reading the manuscript placed on platen glass. Then, manuscript reading part 12 is read scanning the manuscript placed on platen glass and obtains image data. Manuscript reading part 12 outputs the obtained image data to control part 10.

Also, when reading the manuscript fed from manuscript feeding part 13, manuscript reading part 12 moves the scanner to a position that faces the manuscript reading slit. Then, manuscript reading part 12 reads the manuscript via the manuscript reading slit synchronizing with the conveying action of the manuscript by manuscript feeding part 13 and obtains image data. Manuscript reading part 12 outputs the obtained image data to control part 10.

Manuscript feeding part 13 conveys the manuscript read by manuscript reading part 12. Manuscript feeding part 13 is arranged on the upper part of manuscript reading part 12. Manuscript feeding part 13 is provided with the manuscript mounting part and the manuscript transport mechanism. Manuscript feeding part 13 feeds out manuscript placed on the manuscript mounting part one sheet at a time by a manuscript transport mechanism. Then, manuscript feeding part 13 feeds the fed-out manuscript to manuscript reading part 12.

Feeding part 14 feeds out a recording paper one sheet at a time to image formation part 17. Feeding part 14 is provided within a body part.

Connecting part 15 is a connecting unit that performs wireless connection, or the like, with terminal 2. Connecting part 15 includes short distance connecting part 50 and normal connecting part 51.

Short distance connecting part 50 is a circuit for performing connection with comparatively short-distance wireless connection (Hereinafter, it is called "short-range wireless connection"), such as Bluetooth® LE, iBeacon®, NFC (Near Field Radio Communication), or the like. Short distance connecting part 50 can send connection information 300 (FIG. 4) required in order to perform wireless direct connection by wireless LAN (Radio Local Area Network), such as various standards of IEEE-802.11 and WiFi® by normal connecting part 51. Normal connecting part 51 is a circuit for performing long-distance wireless connection rather than short distance connecting part 50, or the like. In the present embodiment, normal connecting part 51 performs wireless connection by WiFi, or the like. In this case, normal connecting part 51 may perform wireless direct connection, such as WiFi-Direct, or the like. Also, normal connecting part 51 can perform the secure wireless communications encrypted in the WPA2, or the like, in the wireless direct connection. Connecting part 15 may include a LAN board, a wireless transmitter and receiver, or the like, for connecting with external networks, such as LAN, WAN, a mobile phone network, or the like. Also, connecting part 15 transmits and receives data by the line for data communications and transmits and receives an audio signal by a voice call line.

Operation panel part 16 is provided with input part 46, display part 47, and authentication part 48. Also, operation panel part 16 is arranged on front-side of image forming apparatus 1.

Input part 46 includes buttons, a touch panel, or the like. The buttons are a numeric keypad, a start, a cancel, switching of operational mode, performing instruction to executing of a job, or the like. Operational mode may include the type of a copy, a FAX transmission, a scanner, a network scanner, or the like. Also, job may include types, such as print, transmission, storage, record for selected document, or the like. Also, input part 46 can input one-time password as described later. Also, input part 46 acquires instructions of the various jobs of image forming apparatus 1 by a user. Also, input part 46 can also input and change each user information according to an instruction by a user. Also, input part 46 may include NFC transmission and reception part including an antenna, a drive circuit, or the like, to transmit and receive information to terminal 2 by NFC.

Display part 47 is a dot-matrix display, or the like, which display a variety of information. In the present embodiment, the display screen for inputting the one-time password described later is displayed on display part 47.

Figure 4:
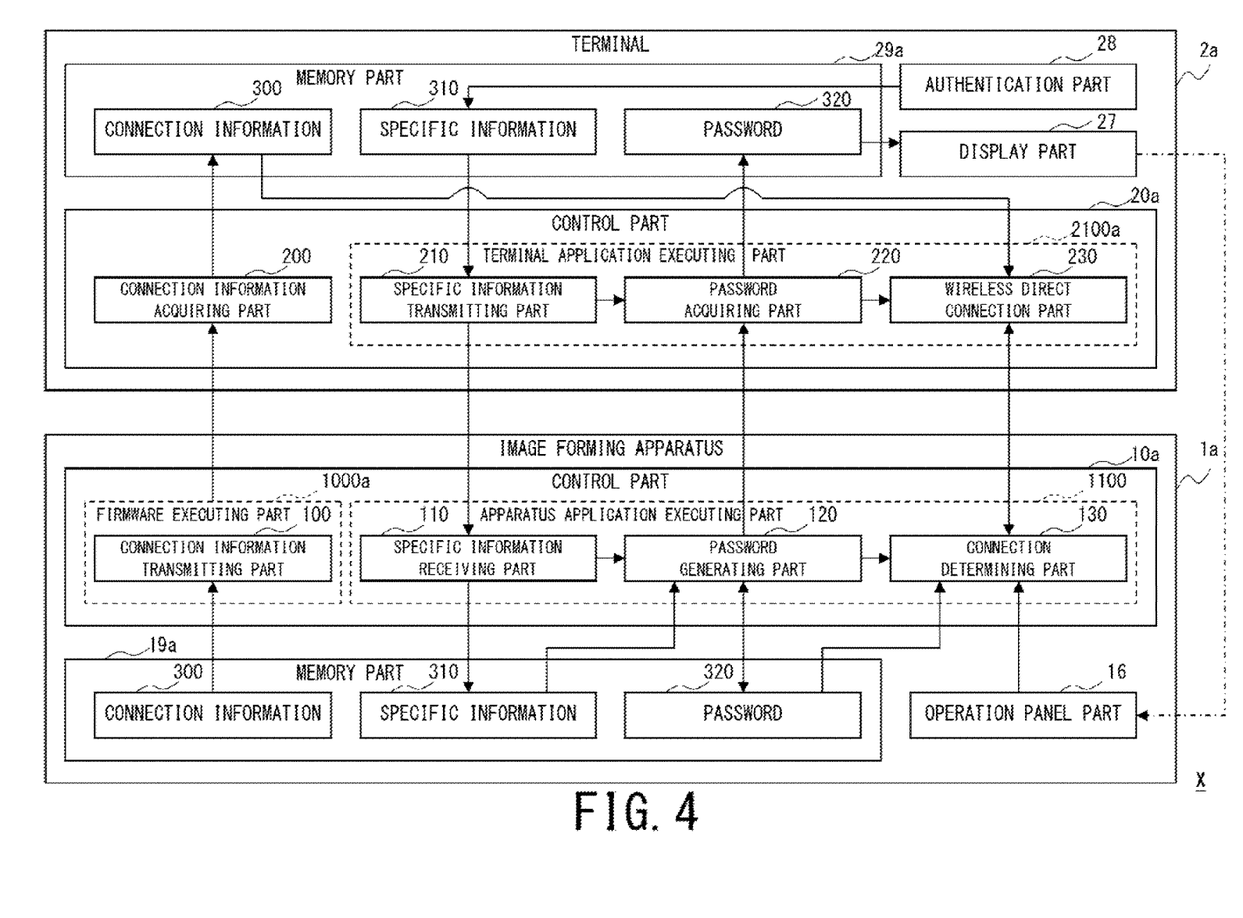
FIG. 4 is a block diagram showing the functional configuration of the image forming system according to the first embodiment of the present disclosure.

Authentication part 48 is a device that performs biometric authentication. For example, authentication part 48 can perform a user's fingerprint authentication, vein authentication, voice authentication, face authentication, or the like. Thereby, authentication part 48 can authenticate whether the user of terminal 2 is the person himself or herself. Authentication part 48 outputs an authentication result as biometric authentication information (FIG. 4). In addition, for example, authentication part 48 may unite with a button or may be provided in the front panel.

Image formation part 17 makes a recording paper perform an image formation from the data stored in memory part 19, read by manuscript reading part 12, or acquired from terminal 2 by an output instruction by a user. Image formation part 17 is provided with a photo conductor drum, an exposure part, a developing part, a transfer part, a fixing part, or the like. Image formation part 17 records a toner image on a recording paper by performing an image formation process having electrification, exposure, development, transfer, and fixing.

Memory part 19 is a non-transitory recording medium. Memory part 19 stores a control program for controlling the operation of image forming apparatus 1. The control program includes programs and data for firmware, OS, various applications, or the like. Also, in the present embodiment, the apparatus application is included in the various applications. In addition, the control program includes a middle-ware being worked on OS, a device driver controlling image forming apparatus 1 according to instructions, or the like. In addition, memory part 19 also stores account settings for a user. Also, the area of the document box (storage folder) for each user may be included in memory part 19.

In image forming apparatus 1, control part 10 and image processing part 11 may be integrally-formed as like CPU with built-in GPU, or the like, and a chip-on module package. Also, control part 10 and image processing part 11 may contain RAM, ROM, a flash memory, or the like. Also, image forming apparatus 1 may be provided with a FAX transmission and reception part that transmits and receives a facsimile.

Figure 3:
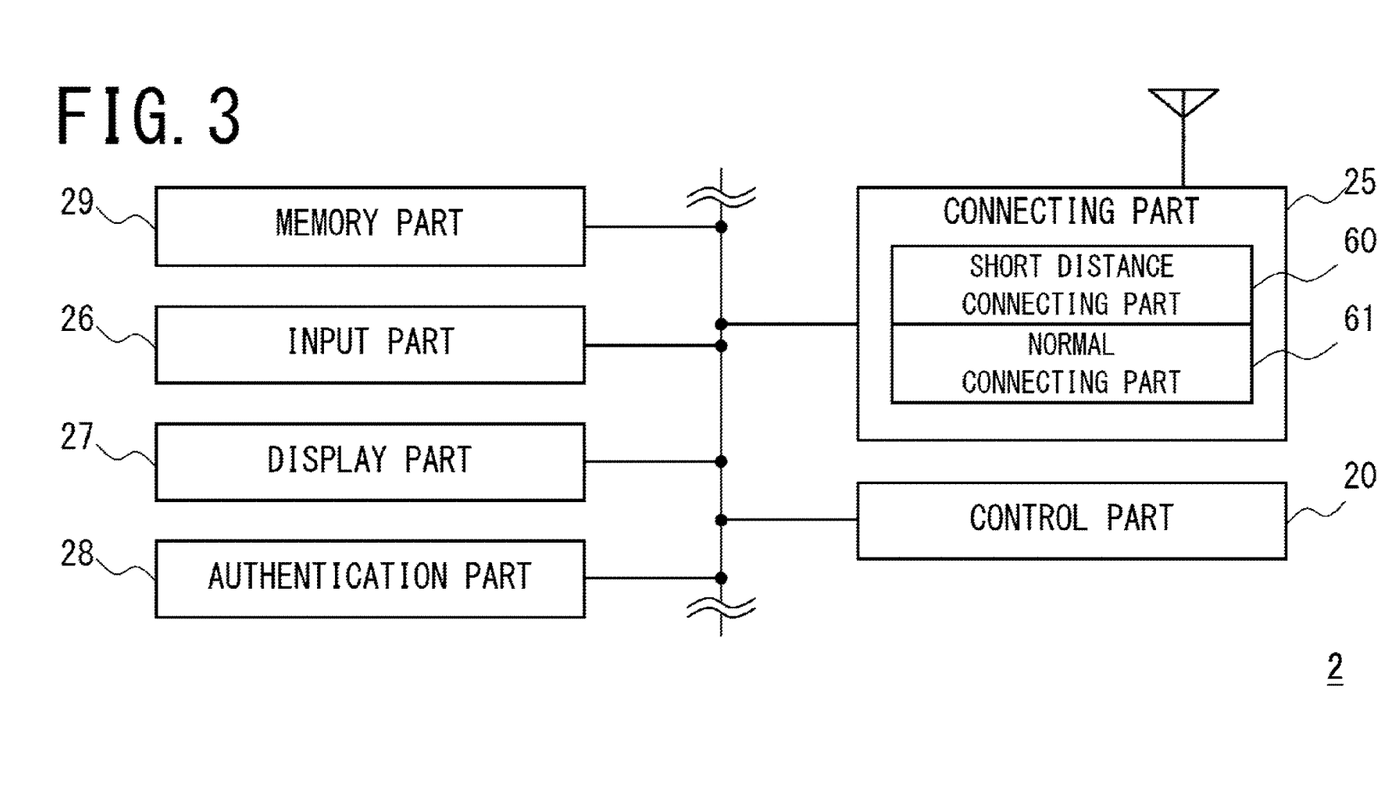
FIG. 3 is a block diagram showing the control configuration of the terminal as shown in FIG. 1.

Then, as refer to FIG. 3, a control configuration of terminal 2 in the present embodiment is described. Terminal 2 includes control part 20, connecting part 25, input part 26, display part 27, and authentication part 28. Each part is connected to control part 20, and its operation is controlled by control part 20.

Control part 20 is an information processing part, such as CPU.

Connecting part 25 is a connecting part that performs wireless connection, or the like, to image forming apparatus 1. Connecting part 25 includes short distance connecting part 60 and normal connecting part 61.

Short distance connecting part 60 is a circuit for performing connection of short-range wireless connection with short distance connecting part 50 in image forming apparatus 1, or the like. Short distance connecting part 60 is ability for receiving connection information 300 (FIG. 4) for performing wireless direct connection by normal connecting part 51.

Normal connecting part 61 is a circuit for performing wireless connection with normal connecting part 51 of image forming apparatus 1, or the like.

Input part 26 acquires the various instructions by a user. Input part 26 is a pointing device, various sensors, a button, or the like. The pointing device includes a touch panel, a digitizer, a touchpad, or the like. Also, it is possible to perform various settings, or the like, for a terminal application or to instruct printing, or the like, by an instruction inputted by a user with input part 26.

Display part 27 is a kind of dot-matrix display. Display part 27 can display a various operation screens associating with GUI (Graphical User Interface). Input part 26 and display part 27 can acquire various instructions inputted by a user by using GUI on OS. In addition, input part 26 and display part 27 may be integrally formed as like the display with a touch panel or a digitizer.

Authentication part 28 is a device to perform biometric authentication. Authentication part 28 may perform fingerprint authentication, vein authentication and voice authentication, face authentication, or the like, for a user. Also, authentication part 28 may output the biometric authentication information (FIG. 4) that is a result of the biometric authentication. In addition, authentication part 28 may be a similar type device as like authentication part 48 in image forming apparatus 1. That means, the biometric authentication information acquired by authentication part 28 may be similar to biometric authentication information acquired by authentication part 48 in image forming apparatus 1.

Memory part 29 is a non-transitory recording medium. Also, memory part 29 may include external storages, such as various flash memories and an optical recording medium. Also, a control program for controlling operation of terminal 2 is stored in memory part 29. The control program also includes the program and data for OS and the terminal application. In addition, memory part 29 may store a user account setting, a storage folder, or the like.

In addition, control parts 10, 20 may integrate a non-transitory recording medium. Also, control parts 10, 20 read the control programs stored in memory parts 19, 29, and they expand and execute the control programs, respectively. Thereby, they are operated as each part of the functional block as described below.

[Functional Configuration of Image Forming System X]

Here, as refer to FIG. 4, a functional configuration of image forming system X is described. Control part 10*a* of image forming apparatus 1*a* includes connection information transmitting part 100, specific information receiving part 110, password generating part 120, and connection determining part 130. In the present embodiment, connection information transmitting part 100 is configured by firmware executing part 1000*a* that executes the firmware stored in memory part 19*a*. Also, specific information receiving part 110, password generating part 120, and connection determining part 130 are configured by apparatus application executing part 1100 that executes the apparatus application stored in memory part 19*a*. Also, memory part 19*a* stores connection information 300, specific information 310, and password 320. Also, control part 20*a* of terminal 2*a* includes connection information acquiring part 200, specific information transmitting part 210, password acquiring part 220, and wireless direct connection part 230. In the present embodiment, wireless direct connection part 230 and password acquiring part 220 are configured by terminal application executing part 2100*a* that executes the terminal application stored in memory part 29*a*. Also, connection information acquiring part 200 may be implemented as a function of OS by executing OS. Also, memory part 29*a* stores connection information 300, specific information 310, and password 320.

Connection information transmitting part 100 transmits connection information 300 of wireless direct connection to terminal 2a by short-range wireless connection.

Specific information receiving part 110 receives specific information 310 from terminal 2a and stores it in memory part 19a.

Password generating part 120 generates password 320 for transmitting to terminal 2a. In this case, to terminal 2a, wireless direct connection is established by using connection information 300 transmitted by connection information transmitting part 100. Also, password generating part 120 may generate password 320 as a one-time password. Also, password generating part 120 may generate password 320 as a password based on specific information 310. Also, when the specific information 310 is biometric authentication information obtained from terminal 2a, password generating part 120 may generate password 320 corresponding to the biometric authentication information. Also, password generating part 120 transmits generated password 320 to terminal 2a.

Connection determining part 130 continues connection with terminal 2a when password 320 transmitted by password generating part 120 is inputted in a self-apparatus. Also, connection determining part 130 disconnects connection with terminal 2a when password 320 is not inputted in the self-apparatus. Also, connection determining part 130 may determine by using password 320 based on the biometric authentication information obtained from terminal 2a as specific information 310. In this case, connection determining part 130 may determine to be inputted or not by comparing the biometric authentication information acquired by authentication part 48 in the self-apparatus and the respective password 320.

Connection information acquiring part 200 connects by short-range wireless connection with image forming apparatus 1a and receives connection information 300 of wireless direct connection.

Specific information transmitting part 210 transmits specific information 310, which is unique to the self-apparatus. Also, specific information transmitting part 210 may acquire biometric authentication information from authentication part when specific information 310 is to the biometric authentication information.

Password acquiring part 220, when wireless direct connection is established by wireless direct connection part 230, receives password 320 and shows display part 27, or the like.

Wireless direct connection part 230 performs wireless direct connection with image forming apparatus 1a by using connection information 300 acquired by connection information acquiring part 200. Also, wireless direct connection part 230 can cut connection with terminal 2a by instructions of connection determining part 130.

Connection information 300 is information for the connection for performing wireless direct connection with image forming apparatus 1a. Connection information 300 may be, for example, SSID of WiFi-Direct, or the like, and an encrypted password, or the like. The encryption may correspond to a various encryption for WiFi, such as WPA2, or the like.

Specific information 310 is identification data unique to terminal 2a and/or a user. Specific information 310 may be, for example, identification information, such as a serial number of terminal 2a, unique ID being unique, and an account name of a user, a user ID, or the like. Also, specific information 310 may be encrypted by public key, a hash function, or the like. Also, specific information 310 may be biometric authentication information, or the like, acquired by authentication part 28 in terminal 2a.

Password 320 is certification information based on character(s), a number, or a sign that a user can input by operation panel part 16, biometric information, or the like. In the present embodiment, password 320 may be, for example, a character string, a numerical sequence, or the like, generated at random and, further, may be a one-time password being changed every time.

Here, control part 10 of image forming apparatus 1 executes the control program stored in memory part 19 and is functioned as connection information transmitting part 100, specific information receiving part 110, password generating part 120, and connection determining part 130. Also, control part 20 of terminal 2 executes the control program stored in memory part 29 and is functioned as connection information acquiring part 200, specific information transmitting part 210, password acquiring part 220, and wireless direct connection part 230. Also, each part of above-mentioned image forming apparatus 1 and terminal 2 serves as hardware resources that performs the image forming method in the present disclosure.

[Connection Establishment Process by Image Forming System X]

Figure 5:
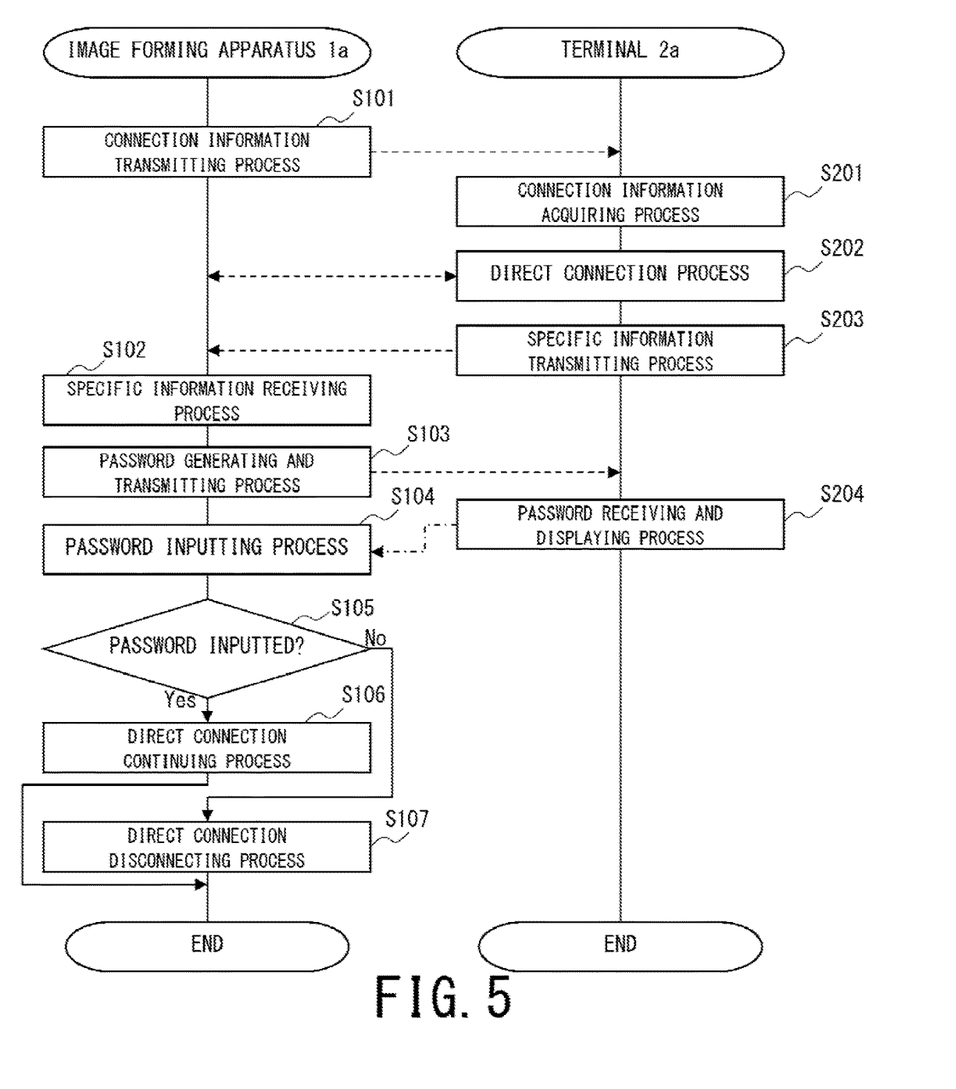
FIG. 5 is a flowchart of the connection establishment process according to the first embodiment of the present disclosure.
Figure 6:
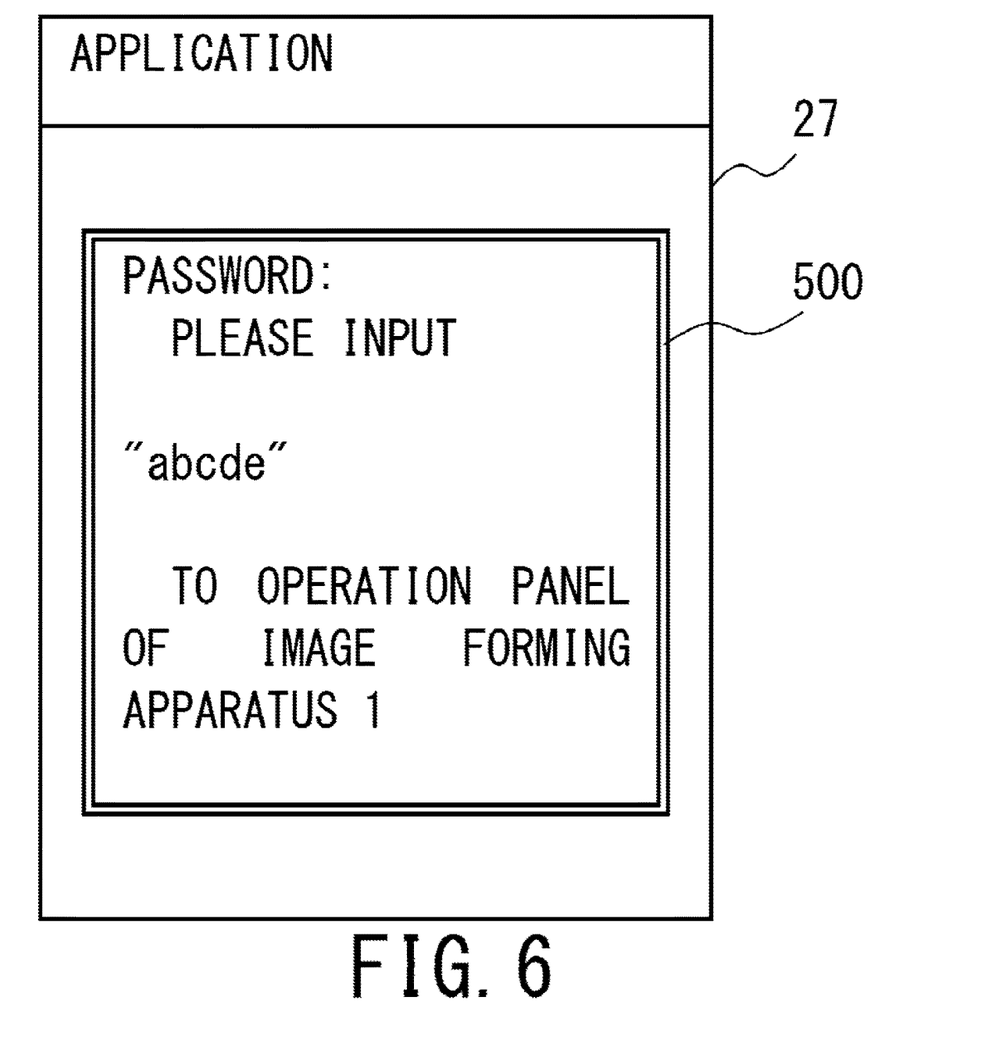
FIG. 6 shows a screen example of the terminal in the connection establishment process as shown in FIG. 5.
Figure 7:
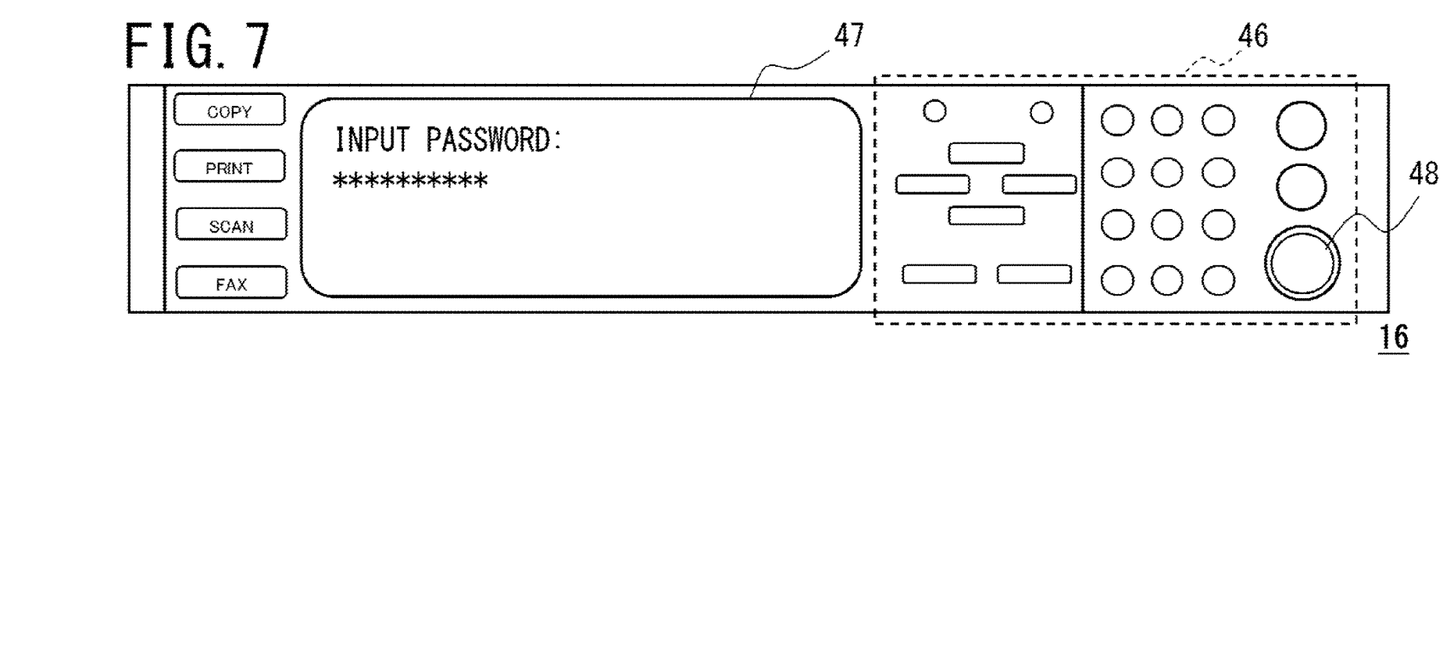
FIG. 7 shows the screen example of the image forming apparatus in the connection establishment process as shown in FIG. 5.

Then, as refer to FIG. 5-FIG. 7, a connection establishment process by image forming system X according to a first embodiment of the present disclosure is explained. In the connection establishment process of the present embodiment, connection information 300 of wireless direct connection is first transmitted to terminal 2a by short-range wireless connection from image forming apparatus 1a. Terminal 2a is connected by short-range wireless connection with image forming apparatus 1a and receives connection information 300 of wireless direct connection. Then, terminal 2a performs wireless direct connection with image forming apparatus 1a by acquired connection information 300. Image forming apparatus 1a generates and transmits password 320 to terminal 2a in which wireless direct connection has been established by transmitted connection information 300. Terminal 2a receives and shows password 320 when wireless direct connection is established. Image forming apparatus 1a continues connection with terminal 2a when transmitted password 320 is inputted, and it disconnects connection with terminal 2a when password 320 is not inputted. In the connection establishment process of the present embodiment, control parts 10a and 20a collaborate with each part, and mainly execute the program stored in memory parts 19a and 29a by using hardware resources, respectively. In the following, as refer to the flow chart of FIG. 5, the details of the connection establishment process in the present embodiment are explained for each step.

(Step S101)

Firstly, connection information transmitting part 100 of image forming apparatus 1a performs a connection information transmitting process. Connection information transmitting part 100 reads connection information 300 from memory part 19a, and transmits it to terminal 2a by short distance connecting part 50. In this case, connection information transmitting part 100 can send connection information 300 to terminal 2a up to approximate radius 5 m away from the self-apparatus by Bluetooth® LE and iBeacon®. Also, connection information transmitting part 100 may transmit connection information 300 when NFC communication is established with terminal 2a.

(Step S201)

Here, connection information acquiring part 200 in terminal 2a performs a connection information acquiring process. Connection information acquiring part 200 connects with image forming apparatus 1*a* by short-range wireless connection. Connection information acquiring part 200 receives connection information 300 of wireless direct connection and stores it in memory part 29*a*. In addition, in this case, connection information acquiring part 200 may start the terminal application stored in memory part 29*a*, and it may make control part 20*a* execute it.

(Step S202)

Then, wireless direct connection part 230 performs a wireless direct connection process. Wireless direct connection part 230 refers to connection information 300 in memory part 29*a* and establishes wireless direct connection with image forming apparatus 1*a* by normal connecting part 61. For example, wireless direct connection part 230 may connect with wireless direct connection part 230 in image forming apparatus 1*a* by using SSID and encrypted password in connection information 300.

(Step S203)

Then, specific information transmitting part 210 performs a specific information transmitting process. Specific information transmitting part 210 refers to specific information 310 in memory part 29*a* and transmits it to image forming apparatus 1*a* by normal connecting part 61. In this case, specific information transmitting part 210 may encrypt identification information and may transmit it to image forming apparatus 1*a*. Also, specific information transmitting part 210 obtains biometric authentication information by authentication part 28 as specific information 310 and may transmit it to image forming apparatus 1*a*.

(Step S102)

Here, specific information receiving part 110 of image forming apparatus 1*a* performs a specific information receiving process. Specific information receiving part 110 receives specific information 310 from terminal 2*a* and stores in memory part 19*a*.

(Step S103)

Then, password generating part 120 performs a password generating and transmitting process. Password generating part 120 generates password 320 and stores it in memory part 19*a*, temporarily. Password generating part 120 may generate password 320 as a random one-time password. Also, password generating part 120 may generate password 320 as a password based on specific information 310. In this case, when specific information 310 is encrypted, password generating part 120 may decrypt this with the secret key stored in memory part 19*a* and may generate password 320. Also, when this specific information 310 is biometric authentication information obtained by authentication part 28 in terminal 2*a*, password generating part 120 may generate password 320 corresponding to the biometric authentication information. When password 320 generated from such specific information 310 is generated, password generating part 120 converts obtained specific information 310 into a character string, a numerical sequence, or the like, by a hash function, or the like, and thus password 320 may be generated. Also, password generating part 120 transmits generated password 320 to terminal 2*a* via wireless direct connection.

(Step S204)

Here, password acquiring part 220 of terminal 2*a* performs password receiving and displaying process. Password acquiring part 220 receives password 320 by wireless direct connection and stores it in memory part 29*b*. According to the example screen of FIG. 6, password acquiring part 220 displays this stored password 320 on display part 27 as display column 500. Thereby, the one-time password is shown to the user. When password 320 is generated based on the biometric authentication information acquired by authentication part 28 in terminal 2*a*, password acquiring part 220 may only display on display part 27 as "Please perform biometric authentication with image forming apparatus 1*a*." Thereby, the process by terminal 2*a* in the connection establishment process in the present embodiment is ended. In addition, if wireless direct connection is not cut as described later, terminal 2*a* continues the wireless direct connection with image forming apparatus 1*a* by using connection information 300.

(Step S104)

Here, connection determining part 130 of image forming apparatus 1*a* performs a password inputting process. According to FIG. 7, connection determining part 130 displays the display screen of "Input password" on display part 47 in operation panel part 16 and acquires the input password that the user inputs by input part 46. In this case, a concealed indication of the acquired password 320 may be given as "*", or the like. In addition, connection determining part 130, if password 320 is generated based on the biometric authentication information obtained by authentication part 28 in terminal 2*a*, may perform authentication by using authentication part 48. That is, in image forming apparatus 1*a*, connection determining part 130 may acquire the input password, which is biometric authentication information for the user, again.

(Step S105)

Then, connection determining part 130 determines whether the right password is inputted or not. Connection determining part 130 acquires an input password from input part 46, and if this input password and password 320 are equivalent, it determines as Yes. That is, connection determining part 130 determines as Yes if password 320 shown at terminal 2*a* is correctly inputted on image forming apparatus 1. Also, connection determining part 130 determines as Yes also if biometric authentication information inputted by authentication part 48 corresponds with password 320 based on the biometric authentication information. Connection determining part 130 determines as No if other. In Yes, connection determining part 130 advances a process to Step S106. In No, connection determining part 130 advances a process to Step S107.

(Step S106)

If the right input password is inputted, connection determining part 130 performs wireless direct connection continuing process. Connection determining part 130 continues wireless direct connection with terminal 2*a*. Thereby, the connection establishment process according to the embodiment in the present disclosure is ended. In this case, it becomes possible to perform printing with image forming apparatus 1*a*, or the like, from a terminal application, or the like, by the user.

(Step S107)

If the right input password is not inputted, connection determining part 130 performs wireless direct connection disconnecting process. Connection determining part 130 instructs to normal connecting part 51 as disconnecting wireless direct connection with terminal 2*a*. In this case, connection determining part 130 may display "Right password is not inputted. Connection is interrupted", or the like, on display part 47 of operation panel part 16. Also, connection determining part 130 may perform an error display on display part 27 in terminal 2*a*. As the above-mentioned, the connection establishment process according to the embodiment in the present disclosure is ended.

The following effects can be obtained with configuration as mentioned above. In a typical technology, even after the wireless direct connection of WiFi-Direct, or the like, is cut, the connection information of wireless direct connection remained in the portable terminal. Therefore, in the case of except for outputting with an image forming apparatus with a portable terminal, it might be connected with the portable terminal. As a result, connection with another portable terminal desiring to connect cannot be performed, or there is a problem of security. On the other hand, image forming system X according to the embodiment in the present disclosure includes terminal 2a and image forming apparatus 1a that can be printed from terminal 2a. Terminal 2a is provided with connection information acquiring part 200, wireless direct connection part 230, and password acquiring part 220. Connection information acquiring part 200 connects with image forming apparatus 1a by short-range wireless connection and receives connection information 300 of wireless direct connection. Wireless direct connection part 230 performs wireless direct connection with image forming apparatus 1a by using connection information 300 acquired by connection information acquiring part 200. Password acquiring part 220 receives and shows password 320 when wireless direct connection is established by wireless direct connection part 230. Image forming apparatus 1a is provided with connection information transmitting part 100, password generating part 120, and connection determining part 130. Connection information transmitting part 100 transmits connection information 300 of wireless direct connection to terminal 2a by short-range wireless connection. Password generating part 120 generates and transmits password 320 to terminal 2a in which wireless direct connection has been established by using connection information 300 transmitted by connection information transmitting part 100. Connection determining part 130 continues connection with terminal 2a when password 320 transmitted by password generating part 120 is inputted, and it disconnects connection with terminal 2a when password 320 is not inputted. As configured in this way, only when required, image forming apparatus 1a certainly connectable with terminal 2a desiring to connect can be given. Also, the security at the time of connection can be raised.

Also, image forming system X related to the embodiment of the present disclosure is characterized by the following: in terminal 2a, wireless direct connection part 230 and password acquiring part 220 are configured that the terminal application, which is the application software for a self-apparatus, is executed by terminal application executing part 2100a of control part 20a in the self-apparatus. Also, in image forming apparatus 1a, connection information transmitting part 100 is configured that firmware of a self-apparatus is executed by firmware executing part 1000a of control part 10a in the self-apparatus. Further, password generating part 120 and connection determining part 130 are configured that an apparatus application for the self-apparatus installed other than the firmware of the self-apparatus is executed by apparatus application executing part 1100 of control part 10a. As configured in this way, even if it does not change the firmware of image forming apparatus 1a, it becomes possible to perform connection being raised security just by installing an apparatus application.

Also, as for image forming system X according to the embodiment in the present disclosure, password generating part 120 generates password 320 as a one-time password. As configured in this way, it becomes possible to perform connection being raised security just by inputting password 320 displayed on terminal 2a.

Also, as for image forming system X according to the embodiment in the present disclosure, terminal 2a is further provided with specific information transmitting part 210 that transmits specific information 310, which is unique to the self-apparatus. Also, image forming apparatus 1a is further provided with specific information receiving part 110 that receives specific information 310 from terminal 2a. Then, password generating part 120 of image forming apparatus 1a generates password 320 as password 320 based on specific information 310. As configured in this way, reduction of the security by forgery of password, or the like, can be prevented, and it enables safer connection.

Also, as for image forming systems X according to the embodiment in the present disclosure, terminal 2a and image forming apparatus 1a further provide authentication parts 28 and 48, which perform biometric authentication, respectively. In this case, specific information 310 is biometric authentication information obtained by authentication part 28 in terminal 2a. Also, password generating part 120 of image forming apparatus 1a generates password 320 corresponding to biometric authentication information. Also, connection determining part 130 compares the biometric authentication information obtained by authentication part 48 in the self-apparatus with password 320 and determines whether password 320 is inputted or not. As configured in this way, it enables to make firm password 320 by using biometric authentication information. Also, because it becomes unnecessary to input password 320, convenience for a user improves.

Second Embodiment

Figure 8:
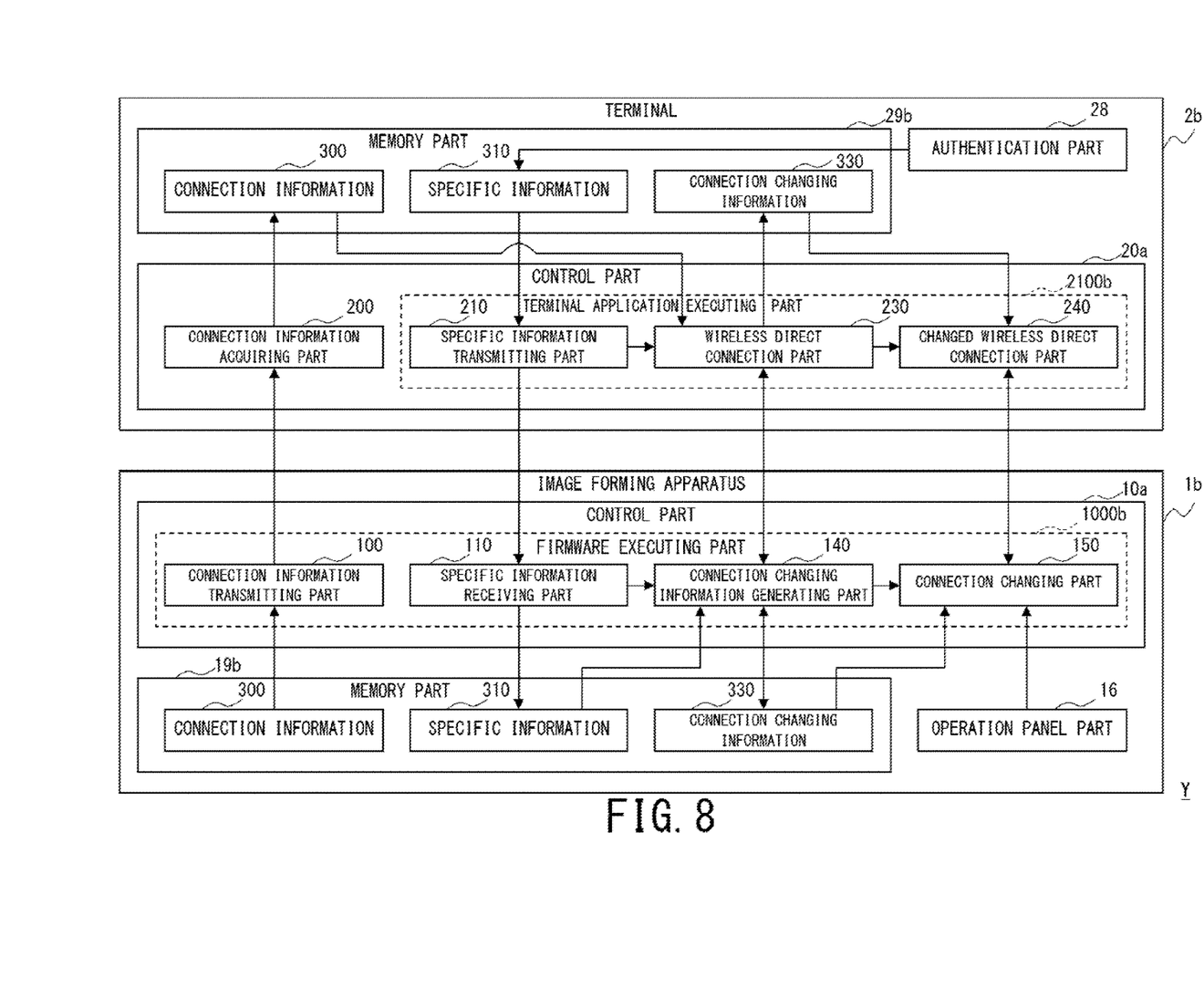
FIG. 8 is a block diagram showing the functional configuration of the image forming system according to a second embodiment of the present disclosure.
Figure 9:
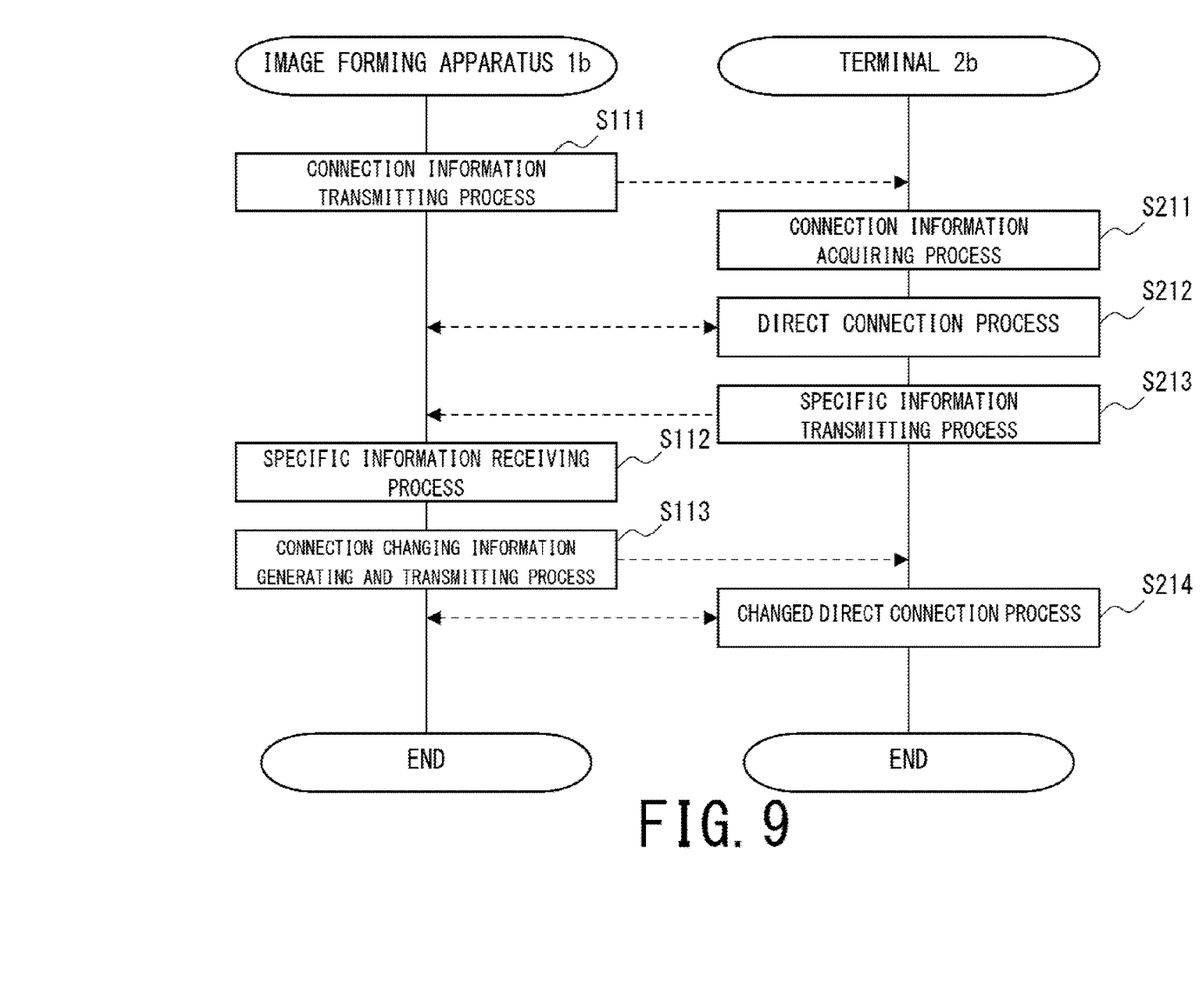
FIG. 9 is a flowchart of the connection establishment process according to the second embodiment of the present disclosure.

Then, as refer to FIG. 8-FIG. 9, image forming system Y according to the second embodiment of the present disclosure is explained. In the present embodiment, special firmware of image forming apparatus 1b is executed. Then, instead of the above-mentioned one-time password, the wireless direct connection with terminal 2b is performed again by using connection changing information 330, which changes SSID, an encrypted password, or the like, for wireless direct connection. Thereby, secure wireless direct connection becomes possible as like the above-mentioned first embodiment.

As refer to FIG. 8, a functional configuration of image forming system Y according to the second embodiment in the present disclosure is described. In addition, in FIG. 8, the same numerals are attached about the similar component as FIG. 4.

Also, control part 10b in image forming apparatus 1b includes connection information transmitting part 100, specific information receiving part 110, connection changing information generating part 140, and connection changing part 150. In the present embodiment, connection information transmitting part 100, specific information receiving part 110, connection changing information generating part 140, and connection changing part 150 are configured by firmware executing part 1000b that executes firmware stored in memory part 19b. Also, memory part 19b stores connection information 300, specific information 310, and connection changing information 330. Control part 20b in terminal 2 includes connection information acquiring part 200, specific information transmitting part 210, wireless direct connection part 230, and changed wireless direct connection part 240. In the present embodiment, specific information transmitting part 210, wireless direct connection part 230, and changed wireless direct connection part 240 are configured by terminal application executing part 2100b that executes the terminal application stored in memory part 29b. Also, connection information acquiring part 200 may be implemented as a function on OS as like the first embodiment. Also, memory part 29b stores connection information 300, specific information 310, and connection changing information 330.

Connection changing information generating part 140 generates connection changing information 330 and transmits it to terminal 2b. In this case, with terminal 2b, wireless direct connection is established by connection information 300 transmitted by connection information transmitting part 100 in image forming apparatus 1b. Also, connection changing information generating part 140 may generate connection changing information 330 based on specific information 310 obtained from terminal 2b and may transmit it. Also, connection changing information generating part 140 may generate connection changing information 330 corresponding to biometric authentication information and may transmit it.

Connection changing part 150 changes into connection changing information 330 transmitted by connection changing information generating part 140 and performs wireless direct connection with terminal 2b.

Changed wireless direct connection part 240, when wireless direct connection is established by wireless direct connection part 230, receives connection changing information 330, which is different from connection information 300, and performs wireless direct connection by using connection changing information 330.

Connection changing information 330 is information for the connection at the time of wireless direct connection being performed by changed wireless direct connection part 240. Connection changing information 330 may also be, for example, different SSID, an encrypted password, or the like, for WiFi-Direct, or the like, from connection information 300. Also, the encrypted password may be generated by connection changing information generating part 140.

Here, control part 10b in image forming apparatus 1b is functioned as connection information transmitting part 100, specific information receiving part 110, connection changing information generating part 140, and connection changing part 150 by executing the control program stored in memory part 19b. Also, control part 20b in terminal 2b is functioned as connection information acquiring part 200, specific information transmitting part 210, wireless direct connection part 230, and changed wireless direct connection part 240 by executing the control program stored by memory part 29b. Also, above-mentioned each part of image forming apparatus 1b and terminal 2b serve as hardware resources that execute the image forming method in the present disclosure.

[Connection Establishment Process by Image Forming System Y]

Then, as refer to FIG. 9, a connection establishment process by image forming system Y according to the second embodiment of the present disclosure is explained. In the connection establishment process of the present embodiment, between image forming apparatus 1b and terminal 2b, it connects by short-range wireless connection and receives connection information 300 for wireless direct connection. Then, by using acquired connection information 300, it performs wireless direct connection. Also, when wireless direct connection is established, connection changing information 330 that is different from connection information 300 is transmitted and received, changes into connection changing information 330, and performs wireless direct connection. In the connection establishment process of the present embodiment, mainly, control parts 10b and 20b collaborates with each part and executes programs stored in memory parts 19b and 20b, respectively by using hardware resources. In the following, a flow chart in FIG. 9 is referred to, details of the connection establishment process by image forming system Y according to the present embodiment are explained for each step.

(Steps S111, S211, S212, S213, and S112)

The processes are executed as like Steps S101, S201, S202, S203, and S102 in the first embodiment, respectively. By the processes, wireless direct connection is established between image forming apparatus 1b and terminal 2b.

(Step S113)

Then, connection changing information generating part 140 performs a connection changing information generating and transmitting process. Connection changing information generating part 140 generates connection changing information 330 and transmits it to terminal 2b. In this case, connection changing information generating part 140 may generate a random encrypted password as connection changing information 330 and may transmit it. Also, connection changing information generating part 140 may generate connection changing information 330 based on specific information 310 acquired from terminal 2b and may transmit it. Also, connection changing information generating part 140 may generate connection changing information 330 corresponding to biometric authentication information and may transmit it. In addition, the biometric authentication information may be obtained by authentication part 48 of image forming apparatus 1b or may be obtained by authentication part 28 of terminal 2b.

(Step S214)

Here, connection changing part 150 of terminal 2b performs a changed direct connection process. Changed wireless direct connection part 240 receives connection changing information 330 that is different from connection information 300 and stores it in memory part 29b. Then, connection changing part 150 changes SSID, the encrypted password, or the like, as corresponded to connection changing information 330 and performs wireless direct connection with terminal 2b. In this case, when connection changing information 330 corresponding to biometric authentication information is used, a connection change part may perform biometric authentication once again by authentication part 28 in terminal 2b and/or authentication part 48 in image forming apparatus 1b. As the above-mentioned, the connection establishment process according to the second embodiment in the present disclosure is ended. Then, terminal 2b and image forming apparatus 1b continue the wireless direct connection corresponding to connection changing information 330 while the wireless direct connection is not cut.

The following effects can be obtained with a configuration as mentioned above. Image forming system Y according to the embodiment of the present disclosure is an image forming system including terminal 2b and image forming apparatus 1b that can be printed from terminal 2b. Terminal 2b is provided with connection information acquiring part 200, wireless direct connection part 230, and changed wireless direct connection part 240. Connection information acquiring part 200 is connected with image forming apparatus 1b by short-range wireless connection and receives connection information 300 of wireless direct connection. Wireless direct connection part 230 performs wireless direct connection with image forming apparatus 1b by using connection information 300 acquired by connection information acquiring part 200. Changed wireless direct connection part 240, when wireless direct connection is established by wireless direct connection part 230, receives connection changing information 330 that is different from connection information 300 and performs wireless direct connection by using connection changing information 330. Image forming apparatus 1b is provided with connection information transmitting part 100, connection changing information generating part 140, and connection changing part 150. Connection information transmitting part 100 transmits connection information 300 to terminal 2b by short-range wireless connection. Connection changing information generating part 140 generates connection changing information 330 by connection information 300 transmitted by connection information transmitting part 100 and transmits it to terminal 2b in which wireless direct connection has been established. Connection changing part 150 changes into connection changing information 330 transmitted by connection changing information generating part 140 and performs wireless direct connection with terminal 2b. As configured in this way, image forming apparatus 1b can raise security at the time of connection with terminal 2b.

Also, as for image forming system Y according to the embodiment of the present disclosure, in terminal 2b, wireless direct connection part 230 and connection information acquiring part 200 are configured that an application software for self-apparatus is executed by terminal application executing part 2100b of the self-apparatus. Also, in image forming apparatus 1b, connection information transmitting part 100, connection changing information generating part 140, and connection changing part 150 are configured that firmware of a self-apparatus is executed by firmware executing part 1000b of the self-apparatus. As configured in this way and by preparing special firmware, hacking for image forming apparatus 1b installed in public places, such as a university, a co-op, and a convenience store, or the like, can be prevented, and security can be raised.

Also, as for image forming system Y according to the embodiment of the present disclosure, terminal 2b is further provided with specific information transmitting part 210 that transmits specific information 310 being unique to the self-apparatus. Also, image forming apparatus 1b is further provided with specific information receiving part 110 that receives specific information 310 from terminal 2b. Also, connection changing information generating part 140 generates connection changing information 330 based on specific information 310 and transmits it. As configured in this way, it becomes difficult to forge connection changing information 330, and it is raised in security.

Also, terminal 2b of image forming system Y related to the embodiment of the present disclosure has authentication part 28 that performs biometric authentication. Also, specific information 310 is biometric authentication information in authentication part 28 in terminal 2b. Also, as for image forming apparatus 1b connection changing information generating part 140 generates connection changing information 330 corresponding to biometric authentication information and transmits it. As configured in this way, by using biometric authentication information, firmer connection changing information 330 can be generated, and security is raised.

Other Embodiments

In addition, the present disclosure is applicable also to information processing apparatus other than an image forming apparatus. That is, it may be a configuration by using a server, or the like, connected a network scanner and a scanner separately connected by USB, or the like.

Also, about a part of functional configuration of the above-mentioned first embodiment and the second embodiment, or arbitrary combination, it may be configured by using an IC, a programmable logic, or the like, as hardware.

Also, the configuration and operation of the above-mentioned embodiment is an example, and it cannot be over-emphasized that it can change suitably and can operate in the range which does not deviate from the aim of the present disclosure.

What is claimed is:

1. An image forming apparatus comprising:
a connection information transmitting part configured to transmit connection information of a wireless direct connection to a terminal by short-range wireless connection;
a connecting part configured to perform the wireless direct connection to the terminal with the connection information;
a connection changing information generating part configured to generate connection changing information being different from the connection information and transmit the connection changing information to the terminal in which the wireless direct connection has been established with the connection information transmitted by the connection information transmitting part;
a connection changing part configured to perform a changed wireless direct connection to the terminal by changing the wireless direct connection with the connection changing information transmitted by the connection changing information generating part; and
a specific information receiving part configured to receive specific information from the terminal;
wherein
the connection changing information generating part generates and transmits the connection changing information based on the specific information received from the terminal.

2. The image forming apparatus according to claim 1, wherein
the connection information transmitting part, the connection changing information generating part, and the connection changing part are configured by a control part that executes firmware of a self-apparatus.

3. The image forming apparatus according to claim 1, further comprising
an operation panel comprising buttons or a touch panel, and further comprising an authentication part configured to perform biometric authentication; and wherein
the specific information is biometrics information in the terminal, and
the connection changing information generating part generates and transmits the connection changing information corresponding to the biometrics information.

4. The image forming apparatus according to claim 3, wherein
the image forming apparatus is configured to generate and transmit the connection information based on the received biometric information and then allow a user of the image forming apparatus to perform biometric authentication using the authentication part of the operation panel.

5. The image forming apparatus according to claim 1, wherein the connection changing information transmitted to the terminal comprises a random encrypted password.

6. An image forming system having a terminal and an image forming apparatus configured to print jobs transmitted from the terminal, wherein:
the terminal includes a connection information acquiring part configured to connect by short-range wireless connection with the image forming apparatus and receive connection information of a wireless direct connection, a wireless direct connection part configured to perform the wireless direct connection to the image forming apparatus with the connection information acquired by the connection information acquiring part, a changed wireless direct connection part configured to receive connection changing information being different from the connection information and perform a changed wireless direct connection by using the connection changing information when the wireless direct connection has been established by the wireless direct connection part; and a specific information transmitting part configured to transmit specific information for the self-apparatus; and the image forming apparatus includes a connection information transmitting part configured to transmit the connection information to the terminal with the short-range wireless connection, a connecting part configured to perform the wireless direct connection to the terminal with the connection information;

a connection changing information generating part configured to generate the connection changing information and transmit the connection changing information to the terminal in which the wireless direct connection has been established by the connection information transmitted with the connection information transmitting part, a connection changing part configured to perform the changed wireless direct connection with the terminal by changing the wireless direct connection with the connection changing information transmitted by the connection changing information generating part; and a specific information receiving part configured to receive the specific information from the terminal;

wherein the connection changing information generating part generates and transmits the connection changing information based on the specific information received from the terminal.

7. The image forming system according to claim 6, wherein in the terminal, the wireless direct connection part and the connection information acquiring part are configured by a control part of a self-apparatus by executing application software for the self-apparatus; and in the image forming apparatus, the connection information transmitting part, the connection changing information generating part, and the connection changing part are configured by a control part by executing firmware for a self-apparatus.

8. The image forming system according to claim 7, wherein the terminal further comprises an authentication part configured to perform biometric authentication, and the specific information is biometric authentication information acquired by the authentication part in the terminal; and in the image forming apparatus, the connection changing information generating part generates and transmits the connection changing information corresponding to the biometric authentication information.

9. The image forming system according to claim 8, wherein the system is configured to perform biometric authentication again after the connection changing information generating part generates and transmits the connection changing information corresponding to the biometric authentication information.

10. The image forming apparatus according to claim 6, wherein the connection changing information transmitted to the terminal comprises a random encrypted password.

11. An image forming method executed by an image forming apparatus, comprising the steps of:

transmitting connection information of wireless direct connection to a terminal by short-range wireless connection;

performing the wireless direct connection with the terminal with the connection information;

receiving specific information from the terminal;

generating connection changing information being different from the connection information, and transmitting the connection changing information to the terminal in which the wireless direct connection has been established with the transmitted connection information, wherein the steps of generating the connection changing information and transmitting the connection changing information are performed based on the specific information received from the terminal; and changing the wireless direct connection with the transmitted connection changing information and performing the changed wireless direct connection to the terminal.

12. The image forming method according to claim 11, wherein the specific information is biometric authentication information acquired in the terminal, and the method comprises generating and transmitting the connection changing information corresponding to the biometric authentication information.

13. The image forming method according to claim 12, wherein the image forming apparatus comprises an operation panel comprising buttons or a touch panel, and further comprising an authentication part configured to perform biometric authentication, and wherein the method further comprises:

allowing a user of the image forming apparatus to perform biometric authentication using the authentication part of the operation panel after the steps of generating and transmitting the connection changing information corresponding to the biometric authentication information.

14. The image forming method according to claim 11, wherein the connection changing information transmitted to the terminal comprises a random encrypted password.

* * * * *